US012792376B1

(12) United States Patent
Ben David et al.

(10) Patent No.: US 12,792,376 B1
(45) Date of Patent: Nov. 10, 2026

(54) TECHNIQUES FOR INSPECTING MANAGED WORKLOADS DEPLOYED IN A CLOUD COMPUTING ENVIRONMENT

(71) Applicant: Wiz, Inc., New York, NY (US)

(72) Inventors: Niv Roit Ben David, Tel Aviv (IL); Yaniv Shaked, Tel Aviv (IL); Yarin Miran, Rishon Lezion (IL); Raaz Herzberg, Tel Aviv (IL); Amir Lande Blau, Tel Aviv (IL)

(73) Assignee: Wiz, Inc., New York, NY (US)

( * ) Notice: Subject to any disclaimer, the term of this patent is extended or adjusted under 35 U.S.C. 154(b) by 888 days.

(21) Appl. No.: 17/804,212

(22) Filed: May 26, 2022

(51) Int. Cl.
*G06F 9/455* (2018.01)

(52) U.S. Cl.
CPC .. *G06F 9/45558* (2013.01); *G06F 2009/4557* (2013.01); *G06F 2009/45587* (2013.01); *G06F 2009/45595* (2013.01)

(58) Field of Classification Search
CPC ......... G06F 9/45558; G06F 2009/4557; G06F 2009/45587; G06F 2009/45595; G06F 21/56; G06F 16/288
See application file for complete search history.

(56) References Cited

U.S. PATENT DOCUMENTS 6,910,132 B1 6/2005 Bhattacharya
7,627,652 B1 12/2009 Commons et al.
7,784,101 B2 8/2010 Verbowski et al.
8,104,075 B2 1/2012 Spector
8,200,965 B2 6/2012 Fujibayashi et al.
8,320,558 B1 11/2012 Zea
8,352,431 B1 1/2013 Protopopov et al.
8,412,688 B1 4/2013 Armangau et al.
(Continued)

FOREIGN PATENT DOCUMENTS

CN 106462439 A 2/2017
CN 109240804 A 1/2019
(Continued)

OTHER PUBLICATIONS

Lin et al., "A Large-scale Data Set and an Empirical Study of Docker Images Hosted on Docker Hub", 2020, IEEE International Conference on Software Maintenance and Evolution (ICSME), pp. 371-381. (Year: 2020).*

(Continued)

*Primary Examiner* — Kenneth Tang
(74) *Attorney, Agent, or Firm* — M&B IP Analysts, LLC

(57) ABSTRACT

A system and method for inspecting managed workloads in a cloud computing environment for cybersecurity threats improves inspection of managed workload service repositories, by only inspecting bases of managed workload deployed in the cloud computing environment. The method includes discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

23 Claims, 4 Drawing Sheets

(56) References Cited

U.S. PATENT DOCUMENTS

| | | | |
|---|---|---|---|
| 8,413,239 | B2 | 4/2013 | Sutton |
| 8,417,967 | B2 | 4/2013 | Foster et al. |
| 8,499,354 | B1 | 7/2013 | Satish et al. |
| 8,595,822 | B2 | 11/2013 | Schrecker et al. |
| 8,701,200 | B2 | 4/2014 | Naldurg et al. |
| 8,789,049 | B2 | 7/2014 | Hutchins et al. |
| 8,813,234 | B1 | 8/2014 | Bowers et al. |
| 8,898,481 | B1 | 11/2014 | Osburn, III et al. |
| 8,904,525 | B1 | 12/2014 | Hodgman et al. |
| 8,914,406 | B1 | 12/2014 | Haugsnes |
| 9,009,836 | B1 | 4/2015 | Yarykin et al. |
| 9,094,379 | B1 | 7/2015 | Miller |
| 9,119,017 | B2 | 8/2015 | Sinha |
| 9,165,142 | B1 | 10/2015 | Sanders et al. |
| 9,172,621 | B1 | 10/2015 | Dippenaar |
| 9,185,136 | B2 | 11/2015 | Dulkin et al. |
| 9,330,273 | B2 | 5/2016 | Khetawat et al. |
| 9,369,433 | B1 | 6/2016 | Paul |
| 9,419,996 | B2 | 8/2016 | Porat |
| 9,438,634 | B1 | 9/2016 | Ross et al. |
| 9,467,473 | B2 | 10/2016 | Jayaraman |
| 9,544,327 | B1 | 1/2017 | Sharma et al. |
| 9,563,385 | B1 | 2/2017 | Kowalski et al. |
| 9,569,328 | B2 | 2/2017 | Pavlov et al. |
| 9,582,662 | B1 | 2/2017 | Messick et al. |
| 9,596,235 | B2 | 3/2017 | Badam et al. |
| 9,607,104 | B1 | 3/2017 | Turner et al. |
| 9,646,172 | B1 | 5/2017 | Hahn |
| 9,661,009 | B1 | 5/2017 | Karandikar et al. |
| 9,665,465 | B1 | 5/2017 | Jain et al. |
| 9,672,355 | B2 | 6/2017 | Titonis et al. |
| 9,712,503 | B1 | 7/2017 | Ahmed |
| 9,892,261 | B2 | 2/2018 | Joram et al. |
| 10,002,247 | B2 | 6/2018 | Suarez et al. |
| 10,032,032 | B2 | 7/2018 | Suarez et al. |
| 10,063,445 | B1 | 8/2018 | Preece |
| 10,135,826 | B2 | 11/2018 | Reddy |
| 10,229,125 | B2 | 3/2019 | Goodman et al. |
| 10,255,370 | B2 | 4/2019 | Carpenter et al. |
| 10,360,025 | B2 | 7/2019 | Foskett et al. |
| 10,412,103 | B2 | 9/2019 | Haugsnes |
| 10,412,109 | B2 | 9/2019 | Loureiro et al. |
| 10,459,664 | B1 | 10/2019 | Dreier et al. |
| 10,503,904 | B1 | 12/2019 | Singh et al. |
| 10,536,471 | B1 | 1/2020 | Derbeko et al. |
| 10,540,499 | B2 | 1/2020 | Wailly et al. |
| 10,552,610 | B1 | 2/2020 | Vashisht et al. |
| 10,554,507 | B1 | 2/2020 | Siddiqui et al. |
| 10,567,468 | B2 | 2/2020 | Perlmutter |
| 10,572,226 | B2 | 2/2020 | Biskup et al. |
| 10,574,675 | B2 | 2/2020 | Peppe et al. |
| 10,623,386 | B1 | 4/2020 | Bernat et al. |
| 10,630,642 | B2 | 4/2020 | Clark et al. |
| 10,664,619 | B1 | 5/2020 | Marelas |
| 10,691,636 | B2 | 6/2020 | Tabaaloute et al. |
| 10,721,260 | B1 | 7/2020 | Schlarp et al. |
| 10,725,775 | B2 | 7/2020 | Suarez et al. |
| 10,735,430 | B1 | 8/2020 | Stoler |
| 10,735,442 | B1 | 8/2020 | Swackhamer |
| 10,791,138 | B1 | 9/2020 | Siddiqui et al. |
| 10,803,188 | B1 | 10/2020 | Rajput et al. |
| 10,831,898 | B1 | 11/2020 | Wagner |
| 10,887,333 | B1 | 1/2021 | Pereira et al. |
| 10,915,626 | B2 | 2/2021 | Tang |
| 10,924,503 | B1 | 2/2021 | Pereira et al. |
| 10,972,484 | B1 | 4/2021 | Swackhamer |
| 10,984,098 | B2 | 4/2021 | Lavi et al. |
| 10,997,293 | B2 | 5/2021 | Wiest et al. |
| 11,005,860 | B1 | 5/2021 | Glyer et al. |
| 11,016,954 | B1 | 5/2021 | Babocichin et al. |
| 11,044,118 | B1 | 6/2021 | Reed et al. |
| 11,055,414 | B2 | 7/2021 | Claes |
| 11,064,032 | B1 | 7/2021 | Yang et al. |
| 11,099,976 | B2 | 8/2021 | Khakare et al. |
| 11,102,231 | B2 | 8/2021 | Kraning et al. |
| 11,165,652 | B1 | 11/2021 | Byrne |
| 11,216,563 | B1 | 1/2022 | Veselov et al. |
| 11,245,730 | B2 | 2/2022 | Bailey |
| 11,258,825 | B1 | 2/2022 | Yang et al. |
| 11,271,961 | B1 | 3/2022 | Berger |
| 11,334,670 | B2 | 5/2022 | Franco et al. |
| 11,366,897 | B1 | 6/2022 | Ramanathan et al. |
| 11,379,294 | B1 | 7/2022 | A et al. |
| 11,388,183 | B2 | 7/2022 | Hoopes et al. |
| 11,397,808 | B1 | 7/2022 | Prabhu et al. |
| 11,405,426 | B2 | 8/2022 | Nguyen |
| 11,442,989 | B2 | 9/2022 | Dvinov et al. |
| 11,444,974 | B1 | 9/2022 | Shakhzadyan |
| 11,483,317 | B1 | 10/2022 | Bolignano et al. |
| 11,496,498 | B2 | 11/2022 | Wright et al. |
| 11,496,519 | B1 | 11/2022 | Gupta et al. |
| 11,503,063 | B2 | 11/2022 | Rao |
| 11,507,672 | B1 | 11/2022 | Pagnozzi et al. |
| 11,509,658 | B1 | 11/2022 | Kulkarni |
| 11,516,222 | B1 | 11/2022 | Srinivasan et al. |
| 11,520,907 | B1 | 12/2022 | Borowiec et al. |
| 11,546,360 | B2 | 1/2023 | Woodford et al. |
| 11,556,659 | B1 | 1/2023 | Kumar et al. |
| 11,558,401 | B1 | 1/2023 | Vashisht et al. |
| 11,558,423 | B2 | 1/2023 | Gordon et al. |
| 11,567,751 | B2 | 1/2023 | Cosentino et al. |
| 11,570,090 | B2 | 1/2023 | Shen et al. |
| 11,575,696 | B1 | 2/2023 | Ithal et al. |
| 11,593,485 | B1 | 2/2023 | Briliauskas et al. |
| 11,606,378 | B1 | 3/2023 | Delpont et al. |
| 11,614,956 | B2 | 3/2023 | Tsirkin et al. |
| 11,645,390 | B2 | 5/2023 | Vijayvargiya et al. |
| 11,651,055 | B2 | 5/2023 | Saillet et al. |
| 11,662,928 | B1 | 5/2023 | Kumar et al. |
| 11,663,340 | B2 | 5/2023 | Wu et al. |
| 11,669,386 | B1 | 6/2023 | Abrol |
| 11,695,785 | B2 | 7/2023 | Ithal et al. |
| 11,700,233 | B2 | 7/2023 | St. Pierre |
| 11,750,566 | B1 | 9/2023 | Montilla Lugo |
| 11,757,844 | B2 | 9/2023 | Xiao |
| 11,770,398 | B1 | 9/2023 | Erlingsson |
| 11,792,284 | B1 | 10/2023 | Nanduri |
| 11,799,874 | B1 | 10/2023 | Lichtenstein et al. |
| 11,803,766 | B1 | 10/2023 | Srinivasan |
| 11,831,670 | B1 | 11/2023 | Molls et al. |
| 11,836,250 | B2 | 12/2023 | Grossman et al. |
| 11,841,945 | B1 | 12/2023 | Fogel |
| 11,902,282 | B2 | 2/2024 | Ghiold et al. |
| 11,914,707 | B1 | 2/2024 | Ramanathan et al. |
| 11,922,220 | B2 | 3/2024 | Haghighat et al. |
| 11,936,785 | B1 | 3/2024 | Shemesh et al. |
| 11,960,609 | B2 | 4/2024 | Gokhman et al. |
| 11,973,770 | B1 | 4/2024 | Miran et al. |
| 12,003,541 | B2 | 6/2024 | Shulman et al. |
| 12,019,770 | B2 | 6/2024 | Nilsson et al. |
| 12,050,696 | B2 | 7/2024 | Pieno et al. |
| 12,058,177 | B2 | 8/2024 | Crabtree et al. |
| 12,063,305 | B2 | 8/2024 | Ip et al. |
| 12,164,652 | B1 | 12/2024 | Li et al. |
| 12,166,785 | B2 | 12/2024 | Yellapragada et al. |
| 12,278,825 | B2 | 4/2025 | Fogel et al. |
| 12,495,066 | B2 | 12/2025 | Kwon et al. |
| 2002/0133586 | A1 | 9/2002 | Shanklin et al. |
| 2003/0188194 | A1 | 10/2003 | Currie et al. |
| 2003/0217039 | A1 | 11/2003 | Kurtz et al. |
| 2004/0054681 | A1 | 3/2004 | Pitts |
| 2005/0050365 | A1 | 3/2005 | Seki et al. |
| 2005/0071630 | A1 | 3/2005 | Thornton et al. |
| 2005/0251863 | A1 | 11/2005 | Sima |
| 2005/0283645 | A1 | 12/2005 | Turner et al. |
| 2007/0006304 | A1 | 1/2007 | Kramer et al. |
| 2007/0174915 | A1 | 7/2007 | Gribble et al. |
| 2007/0271360 | A1 | 11/2007 | Sahita et al. |
| 2008/0075283 | A1 | 3/2008 | Takahashi |
| 2008/0221833 | A1 | 9/2008 | Brown et al. |
| 2008/0307020 | A1 | 12/2008 | Ko et al. |
| 2008/0320594 | A1 | 12/2008 | Jiang |
| 2009/0106256 | A1 | 4/2009 | Safari et al. |
| 2009/0271863 | A1 | 10/2009 | Govindavajhala et al. |

(56) References Cited

U.S. PATENT DOCUMENTS

2010/0242082 A1 9/2010 Keene et al.
2010/0274970 A1 10/2010 Treuhaft et al.
2010/0281275 A1 11/2010 Lee et al.
2011/0055361 A1 3/2011 Dehaan
2011/0276806 A1 11/2011 Casper et al.
2012/0110651 A1 5/2012 Van Biljon et al.
2012/0297206 A1 11/2012 Nord et al.
2013/0054890 A1 2/2013 Desai et al.
2013/0124669 A1 5/2013 Anderson et al.
2013/0160119 A1 6/2013 Sartin
2013/0160129 A1 6/2013 Sartin
2014/0096134 A1 4/2014 Barak
2014/0115578 A1 4/2014 Cooper et al.
2014/0237537 A1 8/2014 Manmohan
2014/0317677 A1 10/2014 Vaidya
2014/0337613 A1 11/2014 Martini
2015/0033305 A1 1/2015 Shear
2015/0055647 A1 2/2015 Roberts
2015/0067850 A1 3/2015 Baikalov
2015/0095995 A1 4/2015 Bhalerao
2015/0150072 A1 5/2015 Doctor et al.
2015/0161394 A1 6/2015 Ferragut et al.
2015/0163192 A1 6/2015 Jain
2015/0172321 A1 6/2015 Kirti et al.
2015/0254364 A1 9/2015 Piduri et al.
2015/0304302 A1 10/2015 Zhang et al.
2015/0310215 A1 10/2015 McBride et al.
2015/0319160 A1 11/2015 Ferguson et al.
2016/0063037 A1 3/2016 Savkli
2016/0063466 A1 3/2016 Sheridan et al.
2016/0078231 A1 3/2016 Bach et al.
2016/0103669 A1 4/2016 Gamage et al.
2016/0105454 A1 4/2016 Li
2016/0140352 A1 5/2016 Nickolov
2016/0156664 A1 6/2016 Nagaratnam
2016/0224600 A1 8/2016 Munk
2016/0299708 A1 10/2016 Yang et al.
2016/0366185 A1 12/2016 Lee et al.
2017/0026416 A1 1/2017 Carpenter et al.
2017/0034198 A1 2/2017 Powers et al.
2017/0070506 A1 3/2017 Reddy
2017/0104755 A1 4/2017 Arregoces
2017/0111384 A1 4/2017 Loureiro et al.
2017/0126712 A1 5/2017 Crabtree et al.
2017/0163650 A1 6/2017 Seigel et al.
2017/0180421 A1 6/2017 Shieh et al.
2017/0185784 A1 6/2017 Madou
2017/0187686 A1* 6/2017 Shaikh ................ H04L 63/1408
2017/0187743 A1 6/2017 Madou
2017/0223024 A1 8/2017 Desai
2017/0230179 A1 8/2017 Mannan et al.
2017/0237560 A1 8/2017 Mueller et al.
2017/0257347 A1 9/2017 Yan
2017/0285978 A1 10/2017 Manasse
2017/0300690 A1 10/2017 Ladnai et al.
2017/0374136 A1 12/2017 Ringdahl
2018/0004950 A1 1/2018 Gupta et al.
2018/0007087 A1 1/2018 Grady et al.
2018/0026995 A1 1/2018 Dufour et al.
2018/0027009 A1 1/2018 Santos
2018/0063290 A1 3/2018 Yang et al.
2018/0081640 A1 3/2018 Collins
2018/0083987 A1 3/2018 Kislitsin
2018/0150412 A1 5/2018 Manasse
2018/0159882 A1 6/2018 Brill
2018/0181310 A1 6/2018 Feinberg et al.
2018/0191726 A1 7/2018 Luukkala
2018/0219888 A1 8/2018 Apostolopoulos
2018/0234459 A1 8/2018 Kung
2018/0239902 A1 8/2018 Godard
2018/0248902 A1 8/2018 Dânilã-Dumitrescu et al.
2018/0260566 A1 9/2018 Chaganti et al.
2018/0270268 A1 9/2018 Gorodissky et al.
2018/0276084 A1 9/2018 Mitkar et al.
2018/0278639 A1 9/2018 Bernstein et al.
2018/0288129 A1 10/2018 Joshi et al.
2018/0293374 A1 10/2018 Chen
2018/0309747 A1 10/2018 Sweet et al.
2018/0321993 A1 11/2018 McClory
2018/0341768 A1 11/2018 Marshall et al.
2018/0359058 A1 12/2018 Kurian
2018/0359059 A1 12/2018 Kurian
2018/0367548 A1 12/2018 Stokes, III et al.
2019/0007271 A1 1/2019 Rickards et al.
2019/0018961 A1 1/2019 Kostyushko et al.
2019/0043201 A1 2/2019 Strong et al.
2019/0058722 A1 2/2019 Levin et al.
2019/0068617 A1 2/2019 Coleman
2019/0068627 A1 2/2019 Thampy
2019/0081963 A1 3/2019 Waghorn
2019/0095626 A1 3/2019 Mohan
2019/0104140 A1 4/2019 Gordeychik et al.
2019/0116111 A1 4/2019 Izard et al.
2019/0121986 A1 4/2019 Stopel et al.
2019/0132350 A1 5/2019 Smith et al.
2019/0149604 A1 5/2019 Jahr
2019/0166129 A1 5/2019 Gaetjen et al.
2019/0171811 A1 6/2019 Daniel et al.
2019/0191417 A1 6/2019 Baldemair et al.
2019/0205267 A1 7/2019 Richey et al.
2019/0207966 A1 7/2019 Vashisht et al.
2019/0220575 A1 7/2019 Boudreau et al.
2019/0229915 A1 7/2019 Digiambattista et al.
2019/0235900 A1 8/2019 Singh et al.
2019/0236409 A1* 8/2019 Van Der Stockt ...... G06F 18/22
2019/0245883 A1 8/2019 Gorodissky et al.
2019/0260764 A1 8/2019 Humphrey et al.
2019/0266508 A1 8/2019 Bunyk et al.
2019/0278928 A1 9/2019 Rungta et al.
2019/0327258 A1 10/2019 Choi et al.
2019/0334715 A1 10/2019 Gray
2019/0354675 A1 11/2019 Gan et al.
2019/0377988 A1 12/2019 Qi et al.
2020/0007314 A1 1/2020 Vouk et al.
2020/0007569 A1 1/2020 Dodge et al.
2020/0012818 A1 1/2020 Levin et al.
2020/0019469 A1 1/2020 Khan et al.
2020/0021609 A1 1/2020 Kuppanna et al.
2020/0021994 A1 1/2020 Ranjbar et al.
2020/0028862 A1 1/2020 Lin
2020/0044916 A1 2/2020 Kaufman et al.
2020/0050440 A1 2/2020 Chuppala et al.
2020/0082094 A1 3/2020 McAllister et al.
2020/0106782 A1 4/2020 Sion
2020/0117434 A1* 4/2020 Biskup .................... G06F 9/445
2020/0125352 A1 4/2020 Kannan
2020/0137097 A1* 4/2020 Zimmermann ..... H04L 63/1425
2020/0137125 A1* 4/2020 Patnala ................. H04L 63/302
2020/0145405 A1 5/2020 Bosch et al.
2020/0175171 A1 6/2020 Rieger et al.
2020/0183719 A1 6/2020 Shetty et al.
2020/0244678 A1 7/2020 Shua
2020/0244692 A1 7/2020 Shua
2020/0259852 A1 8/2020 Wolff et al.
2020/0287927 A1 9/2020 Zadeh et al.
2020/0320845 A1 10/2020 Livny et al.
2020/0336489 A1 10/2020 Wuest et al.
2020/0382556 A1 12/2020 Woolward et al.
2020/0387357 A1 12/2020 Mathon et al.
2020/0389431 A1 12/2020 St. Pierre
2020/0389469 A1 12/2020 Litichever et al.
2020/0409741 A1 12/2020 Dornemann et al.
2021/0006574 A1 1/2021 Venter et al.
2021/0014265 A1 1/2021 Hadar et al.
2021/0026932 A1 1/2021 Boudreau et al.
2021/0042263 A1 2/2021 Zdornov et al.
2021/0056548 A1 2/2021 Monica et al.
2021/0089662 A1 3/2021 Muniswamy-Reddy et al.
2021/0105304 A1 4/2021 Kraning et al.
2021/0144517 A1 5/2021 Guim Bernat et al.
2021/0149788 A1 5/2021 Downie
2021/0158835 A1 5/2021 Hill et al.
2021/0168150 A1 6/2021 Ross et al.
2021/0176123 A1 6/2021 Plamondon

(56) References Cited

U.S. PATENT DOCUMENTS

| | | | |
|---|---|---|---|
| 2021/0176164 | A1 | 6/2021 | Kung et al. |
| 2021/0185073 | A1 | 6/2021 | Ewaida et al. |
| 2021/0194678 | A1 | 6/2021 | Schindewolf et al. |
| 2021/0200881 | A1 | 7/2021 | Joshi et al. |
| 2021/0203684 | A1 | 7/2021 | Maor et al. |
| 2021/0203761 | A1 | 7/2021 | Ahn et al. |
| 2021/0208983 | A1 | 7/2021 | Lin et al. |
| 2021/0211453 | A1 | 7/2021 | Cooney |
| 2021/0216591 | A1 | 7/2021 | Dvinov et al. |
| 2021/0216630 | A1 | 7/2021 | Karr |
| 2021/0218567 | A1 | 7/2021 | Richards et al. |
| 2021/0226812 | A1 | 7/2021 | Park |
| 2021/0226928 | A1 | 7/2021 | Crabtree et al. |
| 2021/0234889 | A1 | 7/2021 | Burle et al. |
| 2021/0248443 | A1 | 8/2021 | Shu et al. |
| 2021/0263802 | A1 | 8/2021 | Gottemukkula et al. |
| 2021/0273953 | A1 | 9/2021 | Fellows et al. |
| 2021/0286877 | A1 | 9/2021 | Vijayvargiya et al. |
| 2021/0297447 | A1 | 9/2021 | Crabtree et al. |
| 2021/0306416 | A1 | 9/2021 | Mukhopadhyay et al. |
| 2021/0314342 | A1 | 10/2021 | Oberg |
| 2021/0320794 | A1 | 10/2021 | Auh et al. |
| 2021/0326883 | A1 | 10/2021 | Misra et al. |
| 2021/0329019 | A1 | 10/2021 | Shua et al. |
| 2021/0334386 | A1 | 10/2021 | AlGhamdi et al. |
| 2021/0357246 | A1 | 11/2021 | Kumar et al. |
| 2021/0360032 | A1 | 11/2021 | Crabtree et al. |
| 2021/0368045 | A1 | 11/2021 | Verma |
| 2021/0382995 | A1 | 12/2021 | Massiglia et al. |
| 2021/0382997 | A1 | 12/2021 | Yi et al. |
| 2021/0400071 | A1 | 12/2021 | Ray et al. |
| 2021/0405930 | A1 | 12/2021 | Dreier et al. |
| 2021/0406365 | A1 | 12/2021 | Neil et al. |
| 2021/0409486 | A1 | 12/2021 | Martinez |
| 2022/0012771 | A1 | 1/2022 | Gustafson |
| 2022/0030020 | A1 | 1/2022 | Huffman |
| 2022/0035862 | A1 | 2/2022 | Ben-Natan |
| 2022/0035905 | A1 | 2/2022 | Lu et al. |
| 2022/0036208 | A1 | 2/2022 | Rao et al. |
| 2022/0036302 | A1* | 2/2022 | Cella ...................... G06N 20/00 |
| 2022/0053011 | A1 | 2/2022 | Rao et al. |
| 2022/0060497 | A1 | 2/2022 | Crabtree et al. |
| 2022/0086173 | A1 | 3/2022 | Yavo et al. |
| 2022/0094713 | A1 | 3/2022 | Lee et al. |
| 2022/0131888 | A1 | 4/2022 | Kanso |
| 2022/0138512 | A1 | 5/2022 | Saillet et al. |
| 2022/0156396 | A1 | 5/2022 | Bednash et al. |
| 2022/0179964 | A1 | 6/2022 | Qiao et al. |
| 2022/0182403 | A1 | 6/2022 | Mistry |
| 2022/0188273 | A1 | 6/2022 | Koorapati et al. |
| 2022/0188689 | A1 | 6/2022 | Gunawardana et al. |
| 2022/0197926 | A1 | 6/2022 | Passey et al. |
| 2022/0210053 | A1 | 6/2022 | Du |
| 2022/0215101 | A1 | 7/2022 | Rioux et al. |
| 2022/0232024 | A1 | 7/2022 | Kapoor |
| 2022/0232042 | A1 | 7/2022 | Crabtree et al. |
| 2022/0247791 | A1 | 8/2022 | Duminuco et al. |
| 2022/0263656 | A1 | 8/2022 | Moore |
| 2022/0284362 | A1 | 9/2022 | Bellinger et al. |
| 2022/0309166 | A1 | 9/2022 | Shenoy et al. |
| 2022/0326861 | A1 | 10/2022 | Shachar et al. |
| 2022/0327119 | A1 | 10/2022 | Gasper et al. |
| 2022/0335340 | A1 | 10/2022 | Moustafa et al. |
| 2022/0342690 | A1 | 10/2022 | Shua |
| 2022/0342997 | A1 | 10/2022 | Watanabe et al. |
| 2022/0345480 | A1* | 10/2022 | Shua ..................... G06F 21/577 |
| 2022/0345481 | A1 | 10/2022 | Shua |
| 2022/0350931 | A1 | 11/2022 | Shua |
| 2022/0357992 | A1 | 11/2022 | Karpovsky |
| 2022/0374519 | A1 | 11/2022 | Botelho et al. |
| 2022/0374520 | A1 | 11/2022 | Shua |
| 2022/0382784 | A1 | 12/2022 | Osuala et al. |
| 2022/0400128 | A1 | 12/2022 | Kfir et al. |
| 2022/0407685 | A1 | 12/2022 | Xie et al. |
| 2022/0407841 | A1 | 12/2022 | Karpowicz |
| 2022/0407889 | A1 | 12/2022 | Narigapalli et al. |
| 2022/0413879 | A1 | 12/2022 | Passey et al. |
| 2022/0414103 | A1 | 12/2022 | Upadhyay et al. |
| 2022/0417011 | A1 | 12/2022 | Shua |
| 2022/0417219 | A1 | 12/2022 | Sheriff |
| 2023/0007014 | A1 | 1/2023 | Narayan |
| 2023/0011957 | A1 | 1/2023 | Panse et al. |
| 2023/0019015 | A1 | 1/2023 | Ahmed |
| 2023/0027210 | A1 | 1/2023 | Shelton, IV et al. |
| 2023/0032686 | A1 | 2/2023 | Williams et al. |
| 2023/0040635 | A1 | 2/2023 | Narayan |
| 2023/0043336 | A1 | 2/2023 | Mitkar et al. |
| 2023/0075355 | A1 | 3/2023 | Twigg |
| 2023/0087093 | A1 | 3/2023 | Ithal et al. |
| 2023/0095756 | A1 | 3/2023 | Wilkinson et al. |
| 2023/0102103 | A1 | 3/2023 | Mazumder et al. |
| 2023/0110080 | A1 | 4/2023 | Hen |
| 2023/0114821 | A1 | 4/2023 | Thomas et al. |
| 2023/0123477 | A1 | 4/2023 | Luttwak et al. |
| 2023/0125134 | A1 | 4/2023 | Raleigh et al. |
| 2023/0134674 | A1 | 5/2023 | Quinn et al. |
| 2023/0135240 | A1 | 5/2023 | Cody et al. |
| 2023/0136839 | A1 | 5/2023 | Sundararajan et al. |
| 2023/0161614 | A1 | 5/2023 | Herzberg et al. |
| 2023/0164148 | A1 | 5/2023 | Narayan |
| 2023/0164164 | A1 | 5/2023 | Herzberg et al. |
| 2023/0164182 | A1 | 5/2023 | Kothari et al. |
| 2023/0169165 | A1 | 6/2023 | Williams et al. |
| 2023/0171271 | A1 | 6/2023 | Williams et al. |
| 2023/0192418 | A1 | 6/2023 | Horowitz et al. |
| 2023/0208855 | A1 | 6/2023 | Sheriff et al. |
| 2023/0208870 | A1 | 6/2023 | Yellapragada et al. |
| 2023/0224319 | A1 | 7/2023 | Isoyama et al. |
| 2023/0229764 | A1* | 7/2023 | Vohra .................... G06F 21/568 |
| 2023/0231867 | A1 | 7/2023 | Rampura Venkatachar |
| 2023/0237068 | A1 | 7/2023 | Sillifant et al. |
| 2023/0254330 | A1 | 8/2023 | Singh |
| 2023/0297666 | A1 | 9/2023 | Atamli et al. |
| 2023/0325814 | A1 | 10/2023 | Vijayan et al. |
| 2023/0336550 | A1 | 10/2023 | Lidgi et al. |
| 2023/0336578 | A1 | 10/2023 | Lidgi et al. |
| 2023/0376586 | A1 | 11/2023 | Shemesh et al. |
| 2024/0007492 | A1 | 1/2024 | Shen et al. |
| 2024/0037229 | A1 | 2/2024 | Pabón et al. |
| 2024/0045838 | A1 | 2/2024 | Reiss et al. |
| 2024/0073115 | A1 | 2/2024 | Chakraborty et al. |
| 2024/0080329 | A1 | 3/2024 | Reed et al. |
| 2024/0080332 | A1 | 3/2024 | Ganesh et al. |
| 2024/0146818 | A1 | 5/2024 | Cody et al. |
| 2024/0202359 | A1 | 6/2024 | Shukla et al. |
| 2024/0241752 | A1 | 7/2024 | Crabtree et al. |
| 2024/0259396 | A1 | 8/2024 | Kerkar et al. |
| 2025/0055870 | A1 | 2/2025 | Viswambharan et al. |
| 2025/0086280 | A1 | 3/2025 | Murphy et al. |

FOREIGN PATENT DOCUMENTS

| | | | |
|---|---|---|---|
| CN | 112989379 | A | 6/2021 |
| EP | 4160983 | A1 | 4/2023 |
| EP | 4254869 | A2 | 10/2023 |
| JP | 2017120492 | A | 7/2017 |
| RU | 2421792 | C2 | 6/2011 |
| SG | 10202009702X | | 4/2021 |
| SG | 11202103226 | U | 4/2021 |
| WO | 2004034184 | A2 | 4/2004 |

OTHER PUBLICATIONS

Microsoft Docs. "Create a VM from a managed image". Article. Jan. 5, 2022. https://docs.microsoft.com/en-us/azure/virtual-machines/windows/create-vm-generalized-managed.

Sahil Suneja; Safe Inspection of Live Virtual Machines; IEEE; Year:2017; pp. 97-111.

Ali Gholami; Security and Privacy of Sensitive Data in Cloud Computing: A Survey of Recent Developments; ARIX:2016; pp. 131-150.

(56) References Cited

OTHER PUBLICATIONS

Christos Kyrkou; Towards artificial-intelligence-based cybersecurity for robustifying automated driving systems against camera sensor attacks; IEEE 2020; pp. 476-481.
Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).
Henry Hanping Feng; Anomaly Detection Using Call Stack Information; IEEE: Year:2003; pp. 1-14.
International Search Report for PCT Application No. PCT/IB2022/060940 dated Feb. 1, 2023. The International Bureau of WIPO.
International Search Report for PCT/IB2023/050848, dated May 9, 2023. International Bureau of WIPO.
International Search Report of PCT/IB2023/058074, dated Nov. 20, 2023. Searching Authority United States Patent and Trademark Office, Alexandria, Virginia.
International Search Report, PCT/IB23/55312. ISA/US, Commissioner for Patents, Alexandria, Virginia. Dated Aug. 30, 2023.
Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore. ieee.org/stamp/stamp.jsp?tp=&arnumber=9087010 (Year: 2020).
Microsoft Build. "Introduction to Azure managed disks". Aug. 21, 2023, https://docs.microsoft.com/en-us/azure/virtual-machines/managed-disks-overview.
Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).
Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).
Written Opinion of the International Searching Authority for PCT Application No. PCT/IB2022/060940 dated Feb. 1, 2023. The International Bureau of WIPO.
Written Opinion of the International Searching Authority, PCT/IB23/55312. ISA/US Commissioner for Patents, Alexandria, Virginia. Dated Aug. 30, 2023.
Written Opinion of the Searching Authority for PCT/IB2023/050848, dated May 9, 2023. International Bureau of WIPO.
Written Opinion of the Searching Authority of PCT/IB2023/058074, dated Nov. 20, 2023. Searching Authority United States Patent and Trademark Office, Alexandria, Virginia.
Zhang et al. BMC Bioinformatics 2014. "On finding bicliques in bipartite graphs: a novel algorithm and its application to the integration of diverse biological data types". http://www.biomedcentral.com/1471-2105/15/110.
Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).
Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).
Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).
Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).
Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).
Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).
Siqi Ma; Certified Copy? Understanding Security Risks of Wi-Fi Hotspot based Android Data Clone Services; ACM; Year: 2021; pp. 320-331.
No stated author; Downdetector; 2020; retrieved from the Internet https://web.archive.org/web/20201226001244/https://downdetector.com/; pp. 1-8, as printed. (Year: 2020).
No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).
No stated author; IsItoownRightNow; 2020; retrieved from the Internet https://web.archive.org/web/20201202121557/https:// www.isitdownrightnow.com/; pp. 1-2 as printed. (Year: 2020).
Bringhenti Daniele et al: "A novel approach for security function graph configuration and deployment", 2021 IEEE 7th International Conference on Network Softwarization (NetSoft), IEEE, Jun. 28, 2021 (Jun. 28, 2021), pp. 457-463, XP033948302, DOI: 10.1109/NETSOFT51509.2021.9492654 [retrieved on Jul. 20, 2021] * abstract * * Sections I-III *.
Espinha Gasiba Tiago Tiago Gasiba@Siemens Com et al: "Raising Security Awareness of Cloud Deployments using Infrastructure as\ Code through CyberSecurity Challenges", Proceedings of the 1st Conference on Mile-High Video, ACMPUB27, New York, NY, USA, Aug. 17, 2021 (Aug. 17, 2021), pp. 1-8, XP058860050, DOI: 10.1145/3465481.3470030 ISBN: 978-1-4503-9606-6 * abstract * * Sections 1-3 *.
Extended European Search Report and Opinion for EP 22898020.7, dated Sep. 9, 2025. European Patent Office, Munich, Germany.
Extended European Search Report for EP 23746586.9 dated Jul. 23, 2025. European Patent Office, Munich, Germany.
European Search Report and Opinion for EP application 23811275.9, dated Sep. 25, 2025. European Patent Office, Munich, Germany.
CopySnapshot Amazon Elastic Compute Cloud—Published Oct. 20, 2021 (Year: 2021).
Decrypt AWS Key Management Service Published Oct. 27, 2021 (Year: 2021).
How to share encrypted AMIs across accounts to launch encrypted EC2 instances Published May 13, 2019 (Year: 2019).

* cited by examiner

TECHNIQUES FOR INSPECTING MANAGED WORKLOADS DEPLOYED IN A CLOUD COMPUTING ENVIRONMENT

TECHNICAL FIELD

The present disclosure relates generally to cybersecurity and specifically to inspection of managed virtual instances.

BACKGROUND

Cloud computing infrastructure providers, such as Amazon® Web Services (AWS), Google® Cloud Platform (GCP), Microsoft® Azure, and Oracle® Cloud Infrastructure (OCI), are able to provision hardware resources to multiple tenants (i.e., users and groups of users) by creating an abstraction layer and provisioning the resources as requested.

Tenants in a cloud computing infrastructure may have their own cloud computing environments deployed on top of the infrastructure, with resources provisioned thereto. One advantage of a cloud computing infrastructure is therefore the ability to dynamically deploy workloads in the cloud computing environment. This ability is lacking in on-premise network environments, which require a physical installation in order to increase compute resources. Some cloud computing infrastructure providers include a managed virtual instance service. For example, AWS includes Amazon Elastic Container Service (ECS), which is a managed container service.

The service provided by ECS allows a user to upload a container image to a registry which stores the container image, and deploys containers based on the container image in response to demand. The service provides autonomous provisioning of resources, and automatic scaling, which may be beneficial in certain situations.

As another example, a virtual machine (VM) may be deployed using a managed image. For example, Microsoft® Azure Compute Gallery allows storing an image of a disk for a VM, and deploying VMs in a cloud computing environment based on the managed image.

As yet another example, AWS includes a Serverless Application Repository, which is a managed repository for serverless applications. The applications are stored in the repository, including, for example, source code of the application. Instances of the application may be deployed based on the stored application code.

Each of these example repositories may store hundreds, thousands, or more, of different images, application code, and the like, from which a virtual instance may be deployed. However, not every image, application code, and the like, has a corresponding virtual instance which is currently deployed.

While managed workloads certainly have benefits, their deployment is not always fully native to the cloud computing environment, as they are stored outside of the cloud computing environment. Therefore, managed workloads may be susceptible to threats which are more difficult to detect than for workloads which are deployed natively in the cloud computing environment.

Furthermore, a repository may contain thousands or more of different images. Scanning each image for cybersecurity threats is time consuming, resource intensive, and requires devoting cloud resources which add to the operation cost of the cloud environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inspecting managed workloads in a cloud computing environment for cybersecurity threats. The method comprises: discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

Certain embodiments disclosed herein also include a non-transitory computer readable medium having stored thereon causing a processing circuitry to execute a process, the process comprising: discovering a managed workload deployed in a cloud computing environment; determining an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; accessing the base repository to pull the base; and inspecting the base of the deployed managed workload for a cybersecurity threat.

Certain embodiments disclosed herein also include a system for inspecting managed workloads in a cloud computing environment for cybersecurity threats. The system comprises: a processing circuitry; and a memory, the memory containing instructions that, when executed by the processing circuitry, configure the system to: discover a managed workload deployed in a cloud computing environment; determine an identifier of the managed workload, wherein the identifier includes an indicator to a base repository in which a base is stored, and wherein the managed workload is currently deployed in the cloud computing environment, the base repository further storing a plurality of bases, wherein a portion of the plurality of bases do not correspond to a deployed workload; access the base repository to pull the base; and inspect the base of the deployed managed workload for a cybersecurity threat.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
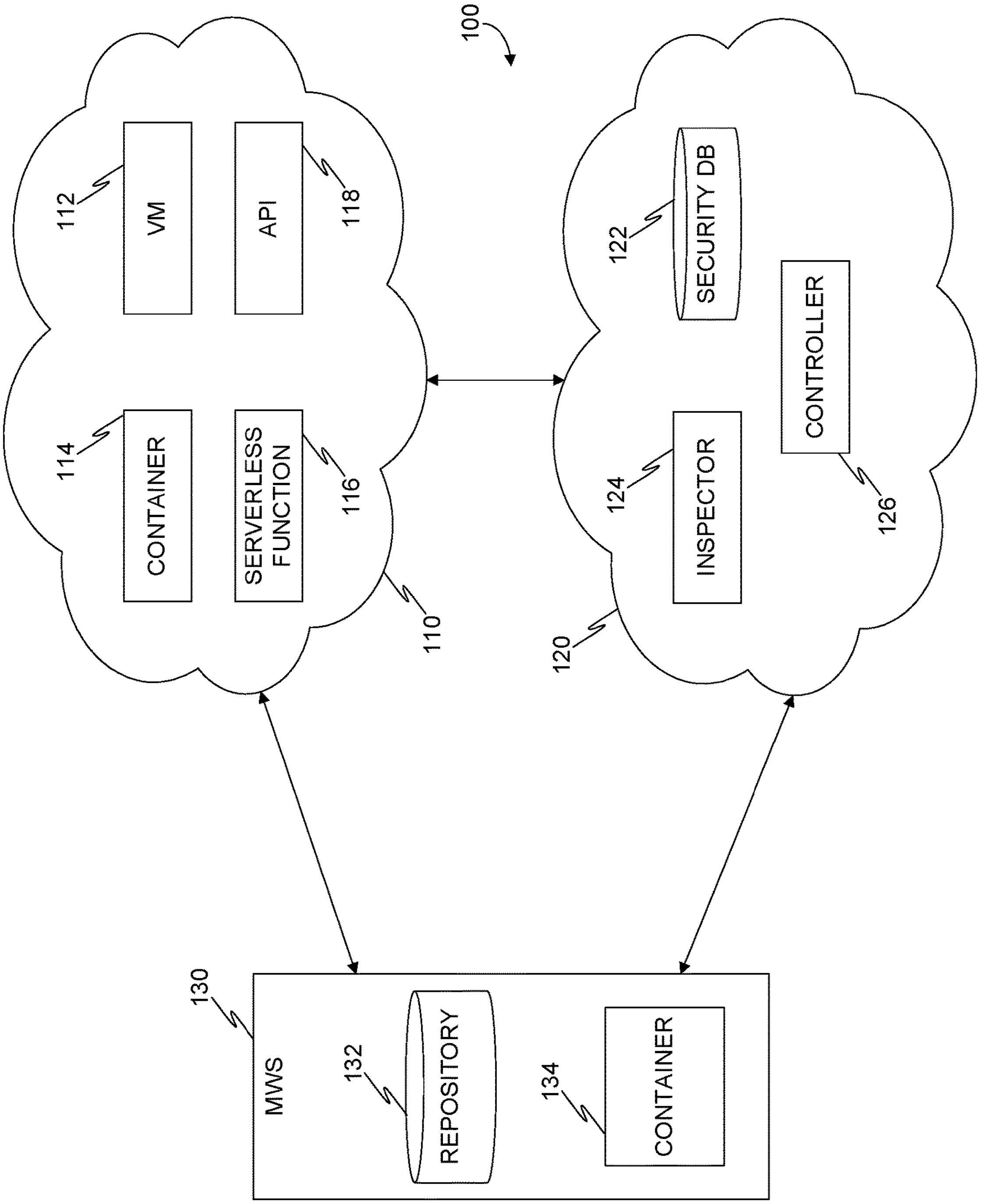
FIG. 1 is a diagram of a cloud computing infrastructure, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for inspecting a managed workload, such as containers, in a cloud computing environment. A managed workload is a workload which is generated (i.e., deployed) based off of an image file, application code, and the like, stored, for example, in a repository of a cloud computing infrastructure. A cloud computing infrastructure may be, for example, Microsoft® Azure, Google® Cloud Platform (GCP), Amazon® Web Services (AWS), and the like. Inspecting a repository of images, application code, and the like, of a cloud computing environment is a resource and time-consuming process. Often repositories contain images which do not correspond to deployed workloads, where a deployed workload is a workload which is, for example, deployed in a production environment. A production environment is a cloud computing environment which provides resources and services to users. By inspecting only the images, application code, and the like, of managed workloads which are actually deployed, resources devoted to inspection may be reduced, as well as a reduction in inspection time.

The various embodiments disclosed herein provide techniques for efficiently inspecting managed workloads which are actually deployed in a cloud computing environment at the time of inspection. The embodiments include discovering and accessing images, application code, and the like, from which the managed workloads are generated. While it is noted that selecting an image of a managed workload for inspection is a process which can be accomplished by a human, such a selection is accomplished inefficiently and inconsistently. Specifically, a human has subjective criteria for selection of managed workload images from an image repository, resulting in an inconsistent selection between different humans. Furthermore, due to the sheer size of the amount of managed workload images stored in a repository, a single human operator using their own same subjective criteria in selecting the images which should be inspected, is highly unlikely to be able to repeat the task of selection with a consistent result.

It is further recognized that a human may provide rules for selecting an image of a managed workload. However, such rules are again created using subjective criteria, and even when an initial set of rules is created, the nature of cloud computing environments is their fast-paced change, meaning a rule created now may be irrelevant in a few minutes, hours, or days, -time. Applying such rules on a consistently changing environment would result in inconsistent application of the rules. Constantly creating rules would again result in an inconsistent application, as a human creates rules based on subjective criteria.

The disclosed embodiments avoid this inconsistent execution by generating objective rules which select managed workload images for inspection based on predefined criteria, selecting the managed workload images based on the predefined criteria, wherein the criteria includes detecting managed workloads actually deployed in a cloud computing environment at the time of inspection, and selecting for inspection only managed workload images which correspond to the workloads which are deployed at the time of inspection in the cloud computing environment.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon. A cloud computing environment 110 is deployed on the cloud computing infrastructure 100. A cloud computing environment 110 may be, for example, a virtual private cloud (VPC) deployed on GCP.

The cloud computing environment 110 includes cloud entities, such as resources and principals. A resource is a cloud entity which supplies functionality, such as processing power, memory, storage, communication, and the like. A resource may supply more than one functionality. Resources may include, for example, virtual machines (VMs) such as VM 112, container engines such as container engines 114, serverless functions such as serverless functions 116, and the like. The cloud computing environment 110 may further include an application programming interface (API), through which actions in the cloud environment may be triggered. A VM may be implemented using Oracle® VirtualBox. A container engine may be implemented using Kubernetes® or Docker®. A serverless function may implemented using Lambda®.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment a principal is implemented as a data structure which includes information about an entity, such as username, a password hash, an associated role, and the like.

The cloud computing environment 110 is communicatively coupled with an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments a portion of the inspection environment 120 is deployed in the cloud computing environment 110. In some embodiments, certain workloads deployed in the inspection environment 120 may be deployed in the cloud computing environment 110.

The inspection environment 120 includes a plurality of inspector workloads, such as inspector 124. The inspector 124 is configured to inspect cloud entities of the cloud computing environment 110. In an embodiment, a snapshot may be generated based on a disk of a workload, such as the container 114. The snapshot may be mounted as a volume which is accessible by the inspector 124. The inspector 124 may inspect the volume for security objects, such as secrets, keys, user account information, and the like. In some embodiments, the inspector 124 inspects the volume for applications, operating systems, binaries, libraries, and the like. The inspector 124 is configured to detect cybersecurity threats, vulnerabilities, misconfigurations, exposures, and the like.

The inspection environment 120 further includes a security database 122, which is implemented as a graph database. A security graph may be stored on the security database 122. The security graph includes a representation of the cloud computing environment 110. For example, cloud entities of the cloud computing environment 110 may be represented each as nodes in the security graph. In an embodiment the security graph is generated based on objects detected by an inspector, such as inspector 124.

A controller 126 is further included in the inspection environment 120. In an embodiment the controller 126 is a workload deployed in the inspection environment 120 which is configured to initiate inspection of the cloud computing environment 110. For example, initiating inspection may include determining what cloud entities to inspect, when to inspect them, and the like.

The inspection environment 120 and cloud computing environment 120 are further communicatively coupled with a managed workload service (MWS) 130. A managed workload service 130 may be, for example, a managed container service, a managed disk service, a managed application service, and the like. While this example embodiment discusses a managed container service, the teachings may equally be applied to other managed workload services without departing from the scope of this disclosure. The MWS 130 may be deployed as a cloud computing environment on a cloud computing infrastructure.

A managed container service (MCS) may be, for example, Amazon® Elastic Container Service (ECS). A managed disk service may be, for example, Azure® Compute Gallery. A managed application service may be, for example, AWS® Serverless Application Repository. The MWS 130 includes a repository 132, and a managed container 134. In an embodiment, the repository 132 is configured to store container images based on which containers are deployed. In other embodiments, the repository 132 is configured to store disk images, application source code, and the like.

In some embodiments, the controller 126 is further configured to query the security graph to detect managed workloads. In an embodiment, the inspector 124 is configured to determine that the container 114 communicates with a managed container 134. The inspector 124 may be configured to perform such a determination by, for example, configuring the inspector 124 to query the API 118 to receive a network communication log of the cloud computing environment 110 and detect that the container 114 sends and receives network messages from the managed container 134. In some embodiments, a name assigned to the managed container 134 may indicate that the managed container 134 is a managed workload. For example, a container named "example-webapp-ecs" is probably managed by ECS. Once a determination is made that a container is a managed container, the controller 126 is configured to send a request to the repository 132 to receive an image on which the managed container 134 is based. The image may then be inspected by the inspector 124.

In an embodiment, inspecting an image may include, for example, generating a disk based on the image, mounting the disk, and configuring an inspector to inspect the disk. In another embodiment, inspecting an application code may include, for example, providing the application code to an inspector, which is configured to detect cybersecurity threats in the application code.

Figure 2:
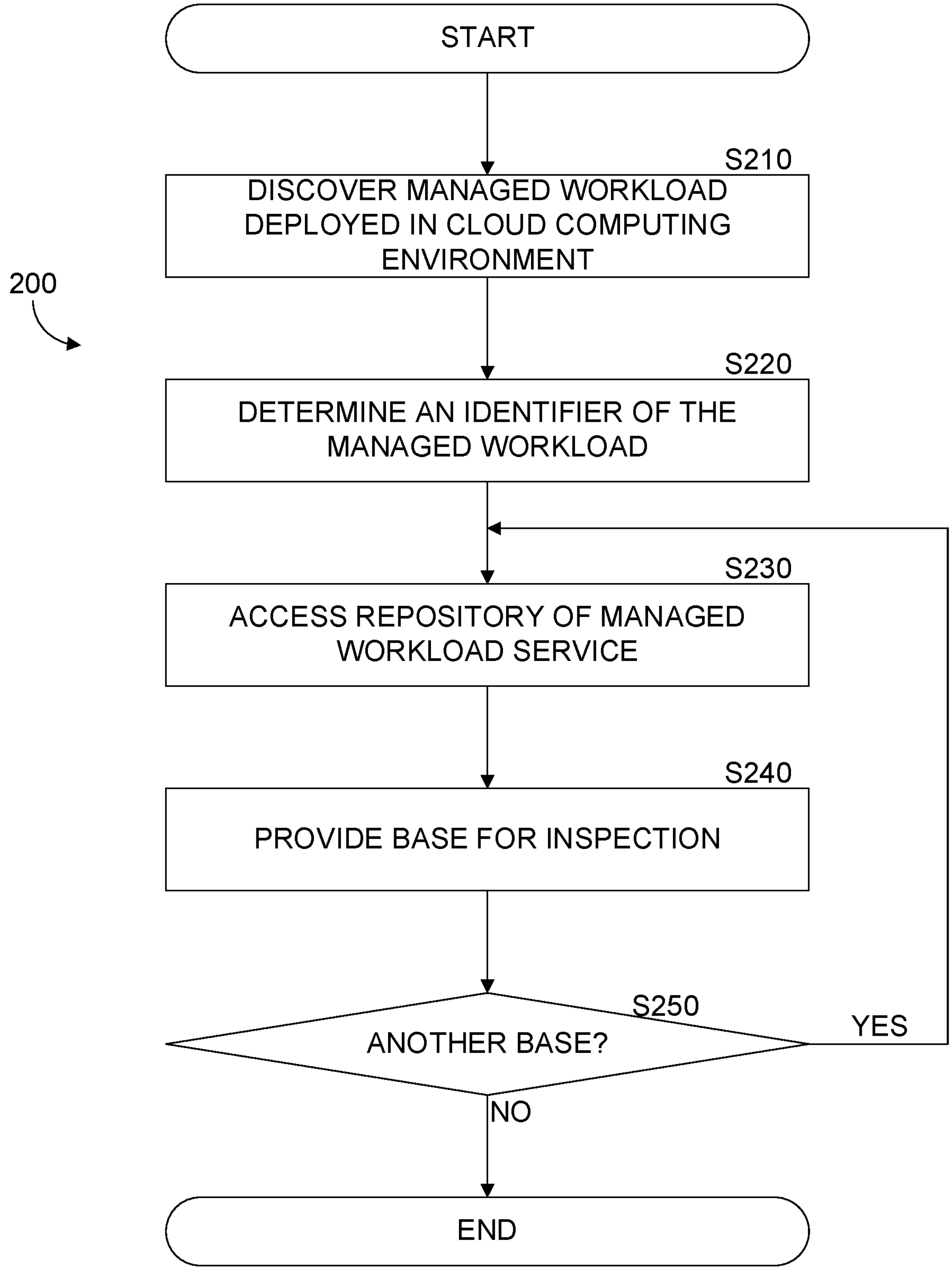
FIG. 2 is a flowchart of a method for inspecting managed workloads, implemented in accordance with an embodiment.

FIG. 2 is an example of a flowchart 200 of a method for inspecting managed workloads, implemented in accordance with an embodiment. An example method for inspecting a workload is discussed in more detail in FIG. 3 below. One advantage of the method described herein is that inspecting an image, application code, and the like, from which a plurality of managed workloads are actually deployed in a cloud computing environment allows to inspect a single image (e.g., once) rather than inspect each of a plurality of managed workloads which are deployed in the cloud computing environment.

At S210, a deployed managed workload is discovered. A managed workload may be, for example, a virtual machine (VM) generated using a managed disk service, a container generated using a managed image, a serverless function deployed using a managed application service, and the like. In an embodiment, discovering a managed workload includes detecting in a network traffic log communication between a workload deployed in a cloud computing environment, and another workload which is deployed outside of the cloud computing environment. In certain embodiments, detecting a managed workload includes parsing a name of a workload into elements, and matching an element against a list of known managed workload services.

A deployed managed workload is a workload which, at the time of inspection, is deployed in a cloud computing environment. A repository for managed workloads may include a large number of images, application code, and the like, which do not all correspond to workloads which are actually deployed. For example, older versions of a workload may be stored in the repository, without a clear indication that they are not actually deployed. By discovering a managed workload which is actually deployed in a cloud computing environment, and then selecting an image (or application code) which corresponds to the deployed managed workload, inspection of the entire repository is avoided, leading to a reduction in resources required for performing inspection for cybersecurity threats.

In an embodiment, a plurality of workloads may be discovered. In certain embodiments, a first portion of the plurality of workloads may be deployed in the cloud computing environment natively, and a second portion of the plurality of workloads may be managed workloads, such as managed containers. As used herein, a native deployment of a workload in a cloud computing environment is a deployment which is performed in response to an instruction generated by a user account, service account, and the like, associated with the cloud computing environment, while a managed workload is a workload, such as a container, VM, serverless function, and the like, which is deployed based on an instruction generated by a managed workload service, such as the MWS 130 of FIG. 1 above.

At S220, an identifier of the managed workload is determined. In some embodiments, a name assigned to the managed workload may indicate that the workload is a managed workload (i.e., generated based off of a managed disk, managed image, managed application code, and the like). For example, a container named "example-webapp-ecs" is probably managed by ECS. A name of the workload may be parsed into elements, and the elements may be matched against a list of known managed virtual workload services.

At S230, a repository of a managed workload service is accessed. In an embodiment, the repository is accessed to pull an image based off of which the managed workload is deployed. In an embodiment, accessing an image of the managed workload includes pulling the image from an image storage (i.e., repository). The image storage may be a managed workload repository, such as Amazon® Elastic Container Registry (ECR). For example, in response to determining that the managed workload is managed by ECS, Amazon ECR may be accessed with a request to pull the image corresponding to the determined identifier. In certain embodiments, a repository of a managed application service may be accessed to pull application code. In other embodiments, a repository of a managed disk service may be accessed to pull an image of a managed disk. A managed image, managed disk, managed application code, and the like, are referred to herein as a base, based off of which a workload may be deployed in a cloud computing environment.

At S240, the base is provided for inspection to detect cybersecurity threats. An example of a method for inspecting a container image is discussed in more detail in FIG. 3 below. In an embodiment, a workload, such as a container, may be deployed in an inspection environment based on an image pulled from a managed container repository. The deployed container may then be inspected, for example according to the method detailed below. A cybersecurity threat may be, for example, a vulnerability, an exposure, a misconfiguration, and the like.

At S250, a check is performed to determine if another base, of a different managed workload, should be inspected. If 'yes', execution may continue with another base at S230. Otherwise, execution may terminate.

Figure 3:
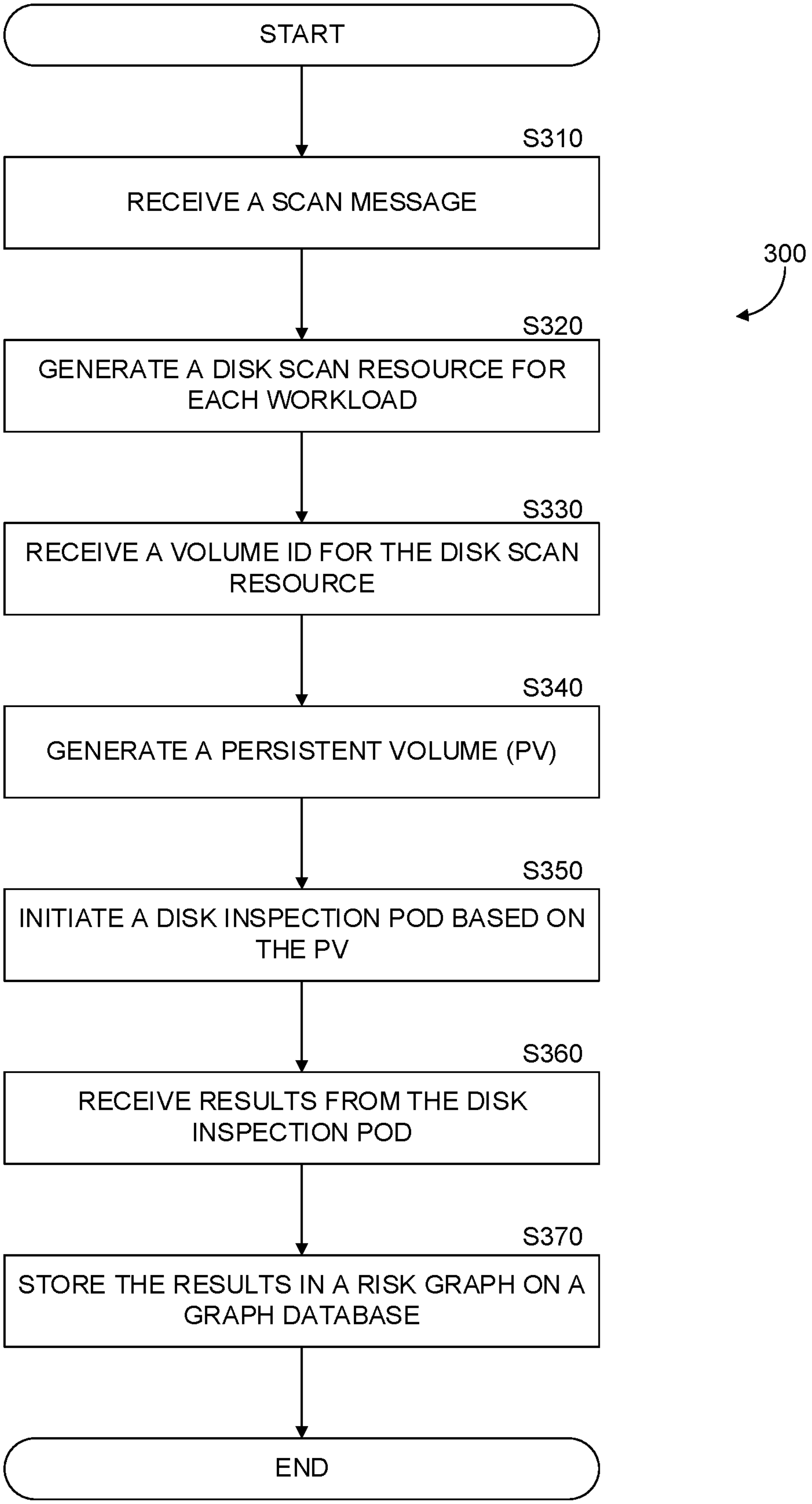
FIG. 3 is a flowchart of a method for inspecting a workload in a cloud computing environment, implemented in accordance with an embodiment.

FIG. 3 is an example flowchart 300 of a method for inspecting a workload in a cloud computing environment, implemented in accordance with an embodiment. In an embodiment the method is performed by the inspector 124. In certain embodiments the workload is a workload generated based off of any one of: an image from an image repository, a disk image from a managed disk service, and an application code from a managed application service. Inspection for cybersecurity threats is performed, in this embodiment, in a container-based computing environment.

At S310, an inspection message is received. The inspection message may be generated by a controller, such as controller 126 of FIG. 1 above. The inspection message may include an identifier of a container node on a cluster and an identifier of a workload (e.g., inspector) for inspecting the contents thereof.

At S320, a disk scan resource is generated. A notification may be generated by a scan broker and received by the operator to indicate that a disk scan resource should be generated. A disk scan resource may be implemented as a storage resource in a cluster. In an embodiment, the disk scan resource is generated by a disk manager service. A disk manager service may provision physical storage resources as virtual storage devices, in order to generate a disk scan resource, which may include one or more such virtual storage devices.

At S330, a volume identifier (ID) is generated for each disk generated for the disk scan resource. A generated disk may be based off a snapshot from a volume of a workload. The volume identifier may be sent to the operator, for example, by a disk manager service.

At S340, a persistent volume (PV) for the generated disk is generated. In an embodiment the PV may be generated by the operator. A persistent volume is a storage resource which is provisioned in a cluster. Optionally, a CSI driver, implemented as a microservice in each different cloud environment, attaches the PV to the node used for inspection, and mounts the PV on the node.

In an embodiment, an instruction is generated to erase the PV in response to completing the disk inspection.

At S350, a pod is generated for disk inspection, with a persistent volume claim (PVC) on the PV. The PVC is a request to access a storage resource. A pod is a set of containers running on a cluster. For example, each container of the inspection pod may include an inspection application which inspects a workload for different types of objects, such as secrets, policies, applications, nested workloads, and the like.

At S360, results from the disk inspection pod are received. Results may be received as objects, which may be used to generate nodes for a graph database, such as the security graph described in FIG. 1 above. Objects may also be files, such as text files, containing passwords, certificates, and other information used for authenticating network communication, and the like.

At S370, at least a portion of the received results are stored in a graph database containing a security graph. Storing results may include generating a node in the security graph, wherein the node is generated based on a predefined schema of the security graph. In other embodiments storing results may include generating an edge connecting a first node to a second node.

Figure 4:
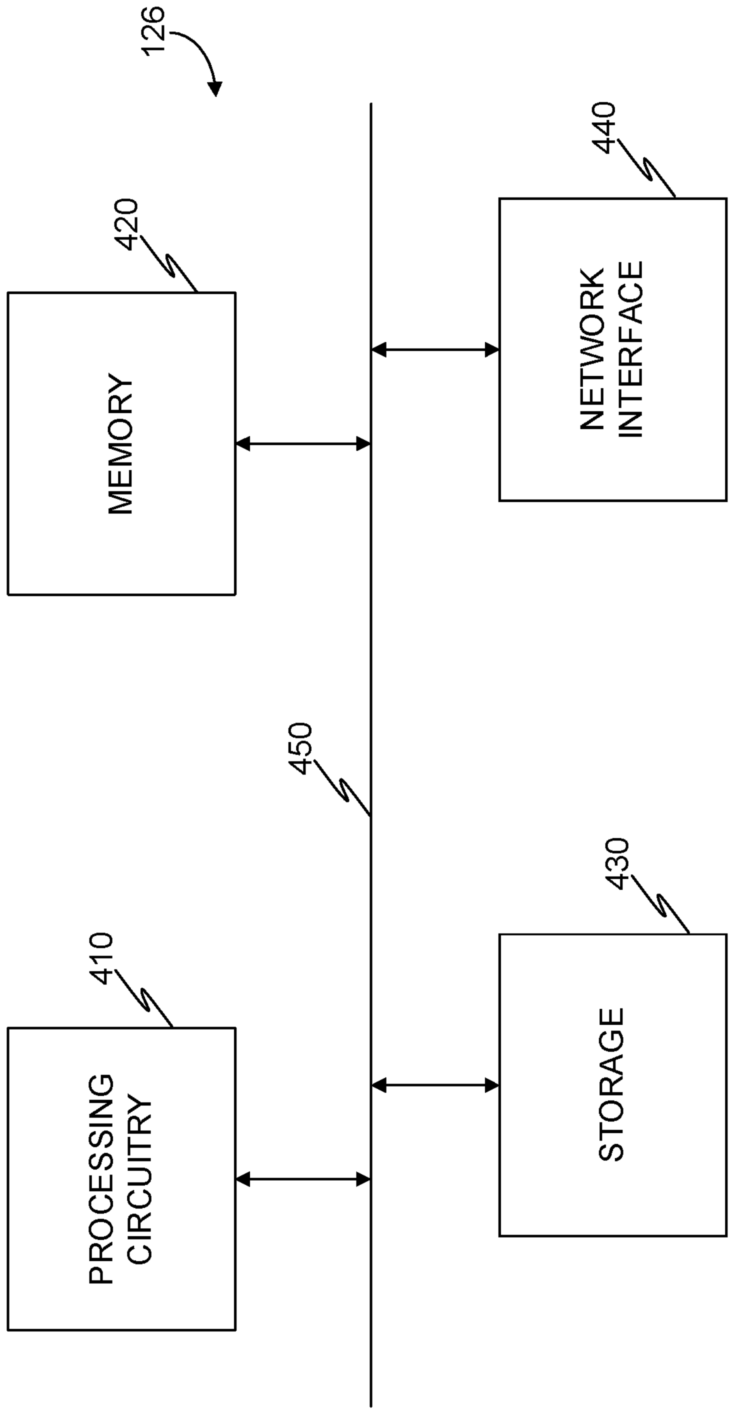
FIG. 4 is a schematic diagram of a controller according to an embodiment.

FIG. 4 is an example schematic diagram of a controller 126 according to an embodiment. The controller 126 includes a processing circuitry 410 coupled to a memory 420, a storage 430, and a network interface 440. In an embodiment, the components of the controller 126 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the controller 126 to communicate with, for example, the inspector 124, the graph database 122, and the like.

It should be understood that the embodiments described herein are not limited to the specific architecture illustrated in FIG. 4, and other architectures may be equally used without departing from the scope of the disclosed embodiments. Furthermore, other workloads described herein, such as the inspector 124, may utilize a similar architecture as the one described above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. The terms workload, virtual instance, and resource are used throughout this disclosure interchangeably, unless otherwise noted.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting managed workloads in a cloud computing environment for cybersecurity threats, comprising:

discovering a managed workload deployed in a cloud computing environment;

determining an identifier of the managed workload, wherein the identifier includes an indicator to a base repository in which a base of the deployed managed workload is stored, and wherein the managed workload is currently deployed in the cloud computing environment, the base repository further storing a plurality of bases, wherein a portion of the plurality of bases do not correspond to a deployed workload;

accessing the base repository to pull the base; and inspecting the pulled base of the deployed managed workload for a cybersecurity threat.

2. The method of claim 1, wherein the base is any one of: a container image, a virtual machine disk image, and an application code of a serverless function.

3. The method of claim 1, wherein the cybersecurity threat is any one of: a misconfiguration, a vulnerability, and an exposure.

4. The method of claim 1, further comprising:

inspecting the base of the deployed managed workload for a cybersecurity threat only when the managed workload is deployed in the cloud computing environment; and configuring an inspector to not inspect a base which does not correspond to a deployed managed workload.

5. The method of claim 1, further comprising:

parsing the identifier into elements; and matching at least one element to a predetermined list of repository identifiers.

6. The method of claim 1, wherein the managed workload is any one of: a container, a virtual machine, and a serverless function.

7. The method of claim 1, wherein the cloud computing environment is represented in a security graph, and wherein the managed workload is represented by a node connected to another node, the another node representing a workload, which is not a managed workload, deployed in the cloud computing environment.

8. The method of claim 7, further comprising:

querying the security graph to detect a node representing the managed workload.

9. The method of claim 1, wherein the cloud computing environment includes a plurality of managed workloads, and a plurality of native workloads.

10. The method of claim 1, further comprising:

deploying a workload in the cloud computing environment based on the base; and inspecting the deployed workload for a cybersecurity threat.

11. The method of claim 10, further comprising:

generating a persistent volume claim (PVC) between a volume associated with the workload and an inspector workload; and inspecting the volume for a cybersecurity threat.

12. A non-transitory computer readable medium having stored thereon instructions for causing a processing circuitry to execute a process, the process comprising:

discovering a managed workload deployed in a cloud computing environment;

determining an identifier of the managed workload, wherein the identifier includes an indicator to a base repository in which a base of the deployed managed workload is stored, and wherein the managed workload is currently deployed in the cloud computing environment, the base repository further storing a plurality of bases, wherein a portion of the plurality of bases do not correspond to a deployed workload;

accessing the base repository to pull the base; and inspecting the pulled base of the deployed managed workload for a cybersecurity threat.

13. A system for inspecting managed workloads in a cloud computing environment for cybersecurity threats, comprising:

a processing circuitry; and a memory, the memory containing instructions that, when executed by the processing circuitry, configure the system to:

discover a managed workload deployed in a cloud computing environment;

determine an identifier of the managed workload, wherein the identifier includes an indicator to a base repository in which a base of the deployed managed workload is stored, and wherein the managed workload is currently deployed in the cloud computing environment, the base repository further storing a plurality of bases, wherein a portion of the plurality of bases do not correspond to a deployed workload;

access the base repository to pull the base; and inspect the pulled base of the deployed managed workload for a cybersecurity threat.

14. The system of claim 13, wherein the base is any one of: a container image, a virtual machine disk image, and an application code of a serverless function.

15. The system of claim 13, wherein the cybersecurity threat is any one of: a misconfiguration, a vulnerability, and an exposure.

16. The system of claim 13, wherein the memory contains further instructions that, when executed by the processing circuitry, further configure the system to:

inspect the base of the deployed managed workload for a cybersecurity threat only when the managed workload is deployed in the cloud computing environment; and configure an inspector to not inspect a base which does not correspond to a deployed managed workload.

17. The system of claim 13, wherein the memory contains further instructions that, when executed by the processing circuitry, further configure the system to:

parse the identifier into elements; and match at least one element to a predetermined list of repository identifiers.

18. The system of claim 13, wherein the managed workload is any one of: a container, a virtual machine, and a serverless function.

19. The system of claim 13, wherein the cloud computing environment is represented in a security graph, and wherein the managed workload is represented by a node connected to another node, the another node representing a workload, which is not a managed workload, deployed in the cloud computing environment.

20. The system of claim 19, wherein the memory contains further instructions that, when executed by the processing circuitry, further configure the system to:

query the security graph to detect a node representing the managed workload.

21. The system of claim 13, wherein the cloud computing environment includes a plurality of managed workloads, and a plurality of native workloads.

22. The system of claim 13, wherein the memory contains further instructions that, when executed by the processing circuitry, further configure the system to:

deploy a workload in the cloud computing environment based on the base; and inspect the deployed workload for a cybersecurity threat.

23. The system of claim 22, wherein the memory contains further instructions that, when executed by the processing circuitry, further configure the system to:

generate a persistent volume claim (PVC) between a volume associated with the workload and an inspector workload; and inspect the volume for a cybersecurity threat.

* * * * *